US006773248B2

(12) United States Patent
Tseng

(10) Patent No.: US 6,773,248 B2

(45) Date of Patent: Aug. 10, 2004

(54) MOLDING DEVICE FOR MOLDING AN INNER END PORTION OF A PAPER PIPE

(76) Inventor: Fa-Shi Tseng, 58, Ma Yuan West St., Taichung (TW)

( * ) Notice: Subject to any disclaimer, the term of this patent is extended or adjusted under 35 U.S.C. 154(b) by 240 days.

(21) Appl. No.: 10/162,389

(22) Filed: May 30, 2002

(65) Prior Publication Data

US 2003/0224083 A1 Dec. 4, 2003

(51) Int. Cl.[7] .......................... B29C 53/34

(52) U.S. Cl. .................. 425/107; 425/392; 425/402; 493/158

(58) Field of Search ....................... 425/107, 392, 425/393, 394, 402, 426; 493/158, 159, 162, 105

(56) References Cited

U.S. PATENT DOCUMENTS 2,778,287 A * 1/1957 Moore ........................ 425/393

3,723,043 A * 3/1973 Leopold et al. ............. 425/393

4,483,670 A * 11/1984 Yamamoto et al. ....... 425/324.1

4,680,016 A * 7/1987 Lynch ........................ 425/394

6,120,426 A * 9/2000 Bacon ........................ 493/158

* cited by examiner

*Primary Examiner*—Robert Davis
*Assistant Examiner*—Thu Khanh T. Nguyen

(57) ABSTRACT

A molding device for molding an inner portion of a paper pipe has a molding head, an annular seat disposed on the molding head, an oil supply tube inserted through the annular seat and inserted in the molding head, a rotating device connected to the oil supply tube, and an oil pipe connected to the rotating device. The molding head has a center hole, a plurality of threaded apertures, an annular guide groove, a plurality of round holes communicating with the annular guide groove, a plurality of expanders, a plurality of expander receiving grooves, and a plurality of shafts. Each expander is inserted in the corresponding expander receiving groove of the molding head. Each shaft which has a recess is inserted through the corresponding round hole of the molding head.

5 Claims, 9 Drawing Sheets

MOLDING DEVICE FOR MOLDING AN INNER END PORTION OF A PAPER PIPE

BACKGROUND OF THE INVENTION

The present invention relates to a molding device for molding an inner portion of a paper pipe. More particularly, the present invention relates to a molding device which molds an inner portion of a paper pipe to form an inward incurved end and a chamfer angle.

A paper pipe often has a plurality of laminated layers adhered by adhesives. The paper pipe is cut to a predetermined length. After the paper pipe is cut, a sharp edge will be formed on an end of the paper pipe. When a thread or a tape winds the paper pipe, the sharp edge of the paper pipe will damage the thread or the tape. Therefore, it is necessary to provide a molding device for molding an inner portion of a paper pipe in a weaving industry.

SUMMARY OF THE INVENTION

An object of the present invention is to provide a molding device which molds an inner portion of a paper pipe.

Another object of the present invention is to provide a molding device which has a lubricating oil to lubricate an inner portion of a paper pipe.

Accordingly, a molding device for molding an inner portion of a paper pipe comprises a molding head, an annular seat disposed on the molding head, an oil supply tube inserted through the annular seat and inserted in the molding head, a rotating device connected to the oil supply tube, and an oil pipe connected to the rotating device. The molding head has a center hole, a plurality of threaded apertures, an annular guide groove, a plurality of round holes communicating with the annular guide groove, a plurality of expanders, a plurality of expander receiving grooves, and a plurality of shafts. Each of the expanders is inserted in the corresponding expander receiving groove of the molding head. Each of the shafts has a recess. Each of the shafts is inserted through the corresponding round hole of the molding head.

DETAILED DESCRIPTION OF THE INVENTION

Figure 1:
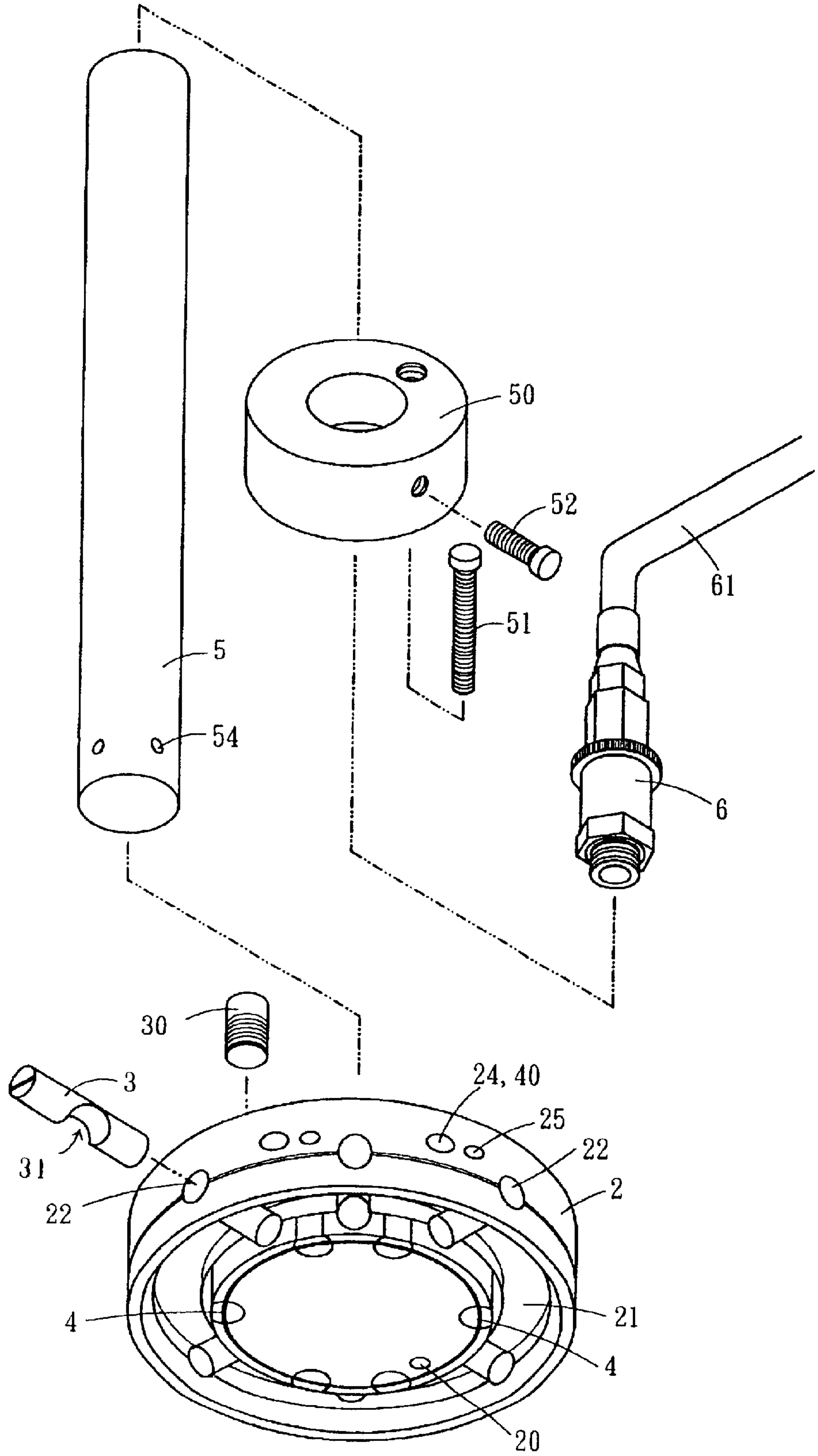
FIG. 1 is a perspective exploded view of a molding device for molding an inner portion of a paper pipe of a preferred embodiment in accordance with the present invention.
Figure 2:
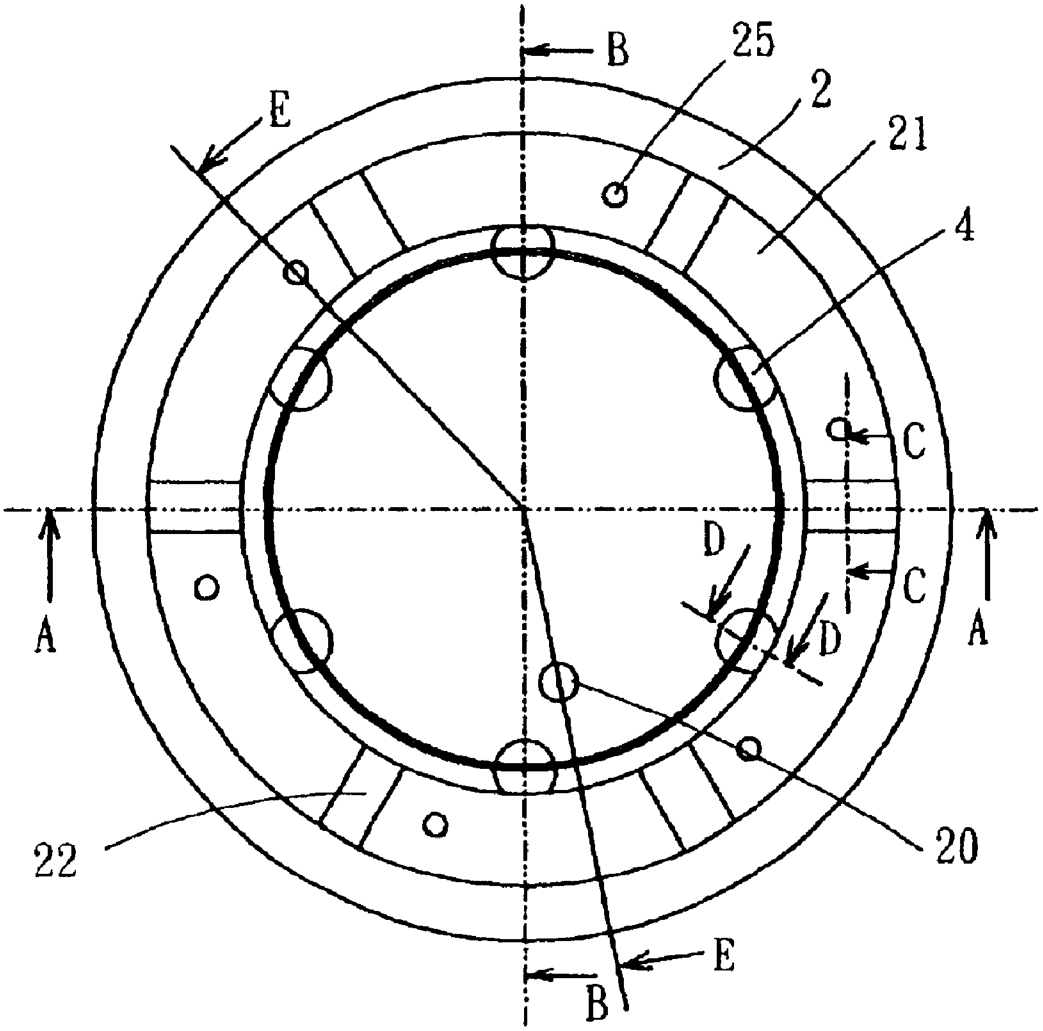
FIG. 2 is a top plan view of a molding head of a preferred embodiment in accordance with the present invention.

Referring to FIGS. 1 to 10, a molding device for molding an inner portion of a paper pipe comprises a molding head 2, an annular seat 50 disposed on the molding head 2, an oil supply tube 5 inserted through the annular seat 50 and inserted in the molding head 2, a rotating device 6 connected to the oil supply tube 5, and an oil pipe 61 connected to the rotating device 6.

The molding head 2 has a center hole 26, a plurality of threaded apertures 20 to receive fasteners in order to position the molding head 2 on a machine (not shown in the figures), an annular guide groove 21, a plurality of round holes 22 communicating with the annular guide groove 21, a plurality of expanders 4, a plurality of expander receiving grooves 23, and a plurality of shafts 3. Each of the expanders 4 is inserted in the corresponding expander receiving groove 23 of the molding head 2.

Each of the shafts 3 has a recess 31.

Each of the shafts 3 is inserted through the corresponding round hole 22 of the molding head 2.

A first bolt 51 fastens the annular seat 50 and the molding head 2 together.

A second bolt 52 fastens the annular seat 50 and the oil supply tube 5 together.

The oil supply tube 5 has an oil release channel 53 and a plurality of oil release holes 54 communicating with the oil release channel 53.

The molding head 2 further has an annular channel 27 matching the oil release holes 54 of the oil supply tube 5, and a plurality of oil apertures 25 communicating with the center hole 26.

When a paper pipe 1 is inserted in the annular guide groove 21 of the molding head 2, a lubricating oil will flow from the oil pipe 61 to the rotating device 6, then to the oil supply tube 5, and then to the molding head 2 in order to lubricate an inner portion of the paper pipe 1.

When the rotating device 6 is rotated, the rotating device 6 drives the oil supply tube 5 to rotate. The oil supply tube 5 drives the molding head 2 to rotate.

Figure 3A:
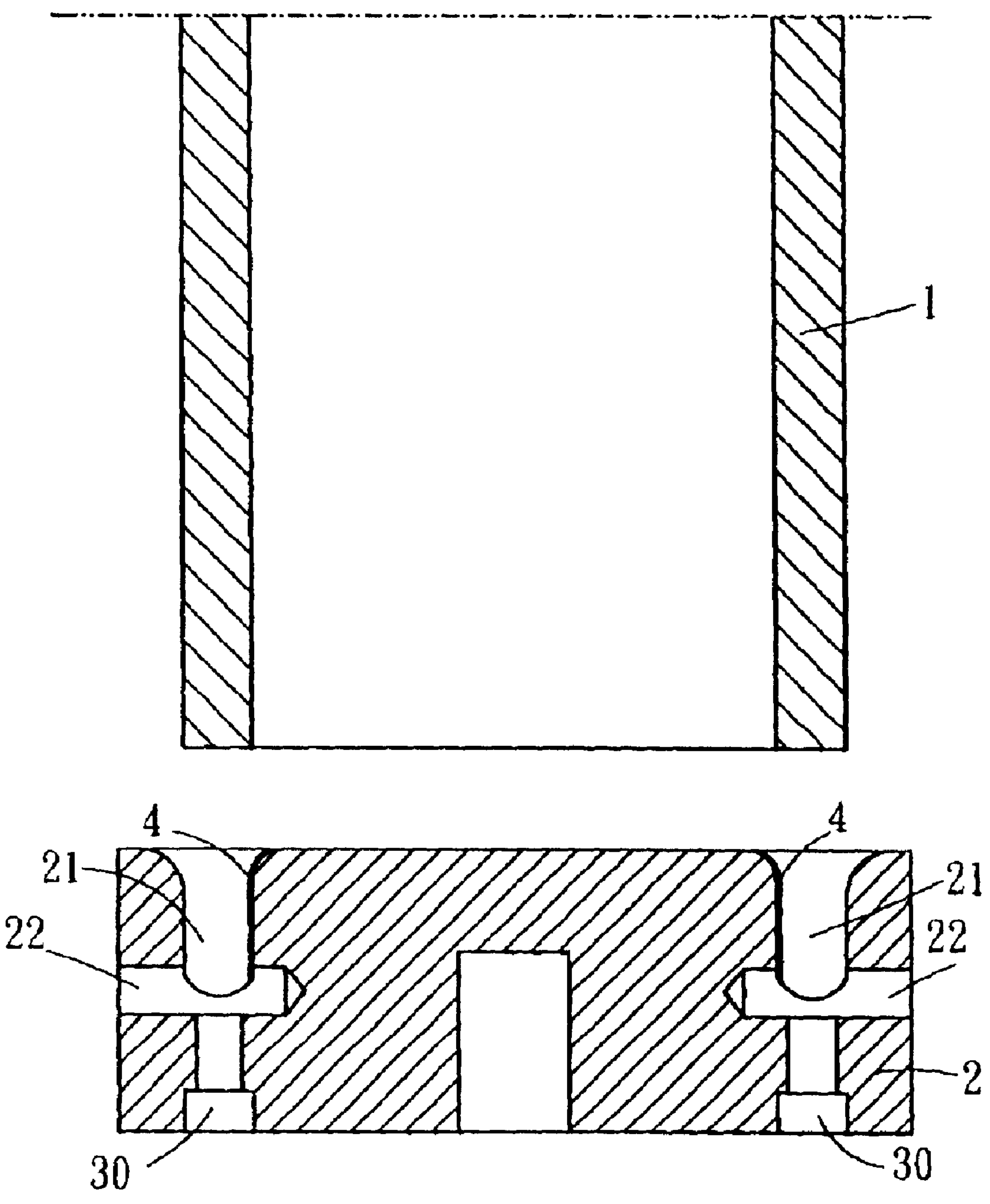
FIG. 3A is a sectional view of a paper pipe and a molding head of a preferred embodiment in accordance with the present invention.
Figure 3B:
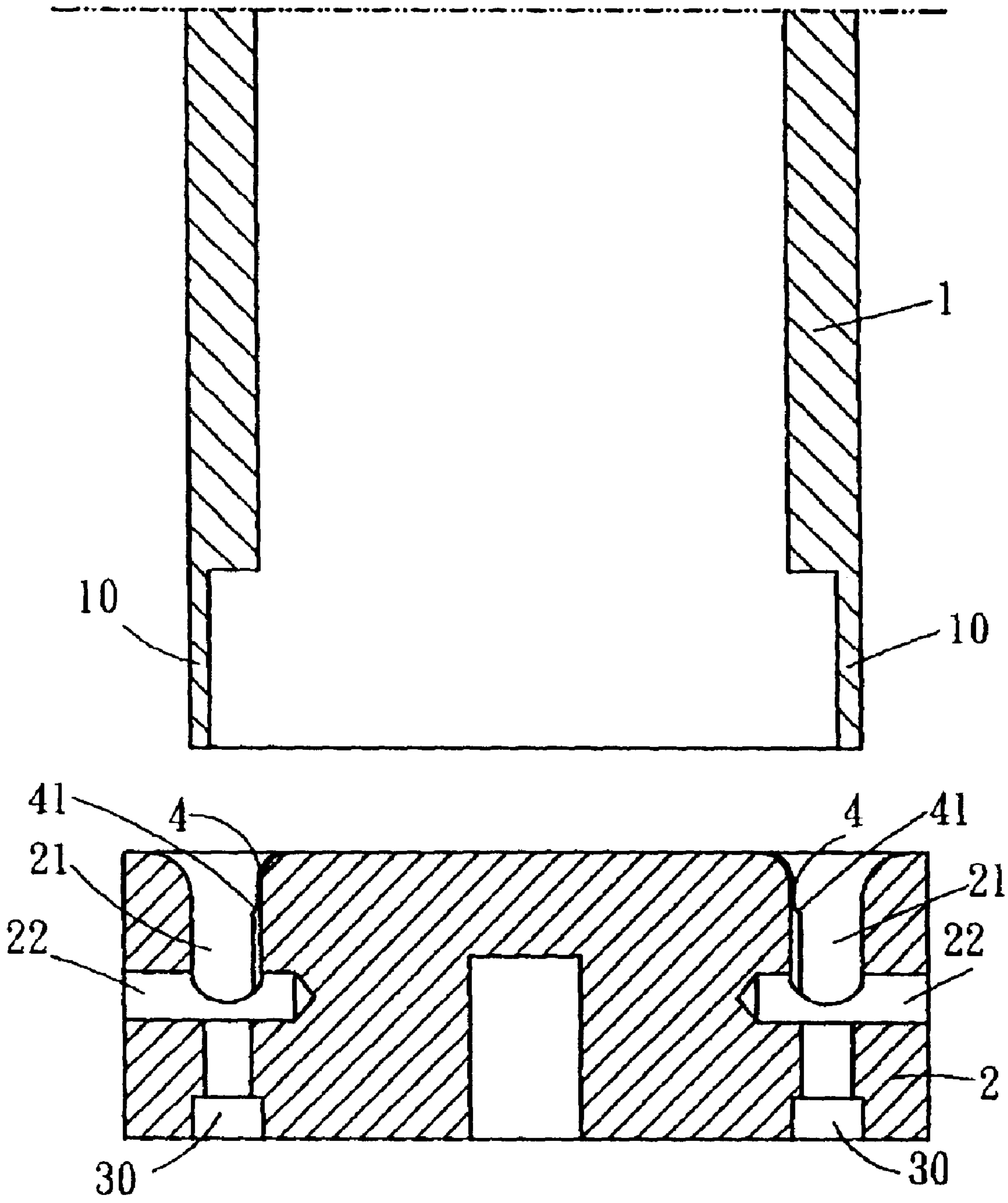
FIG. 3B is another sectional view of a paper pipe and a molding head of a preferred embodiment in accordance with the present invention.
Figure 4:
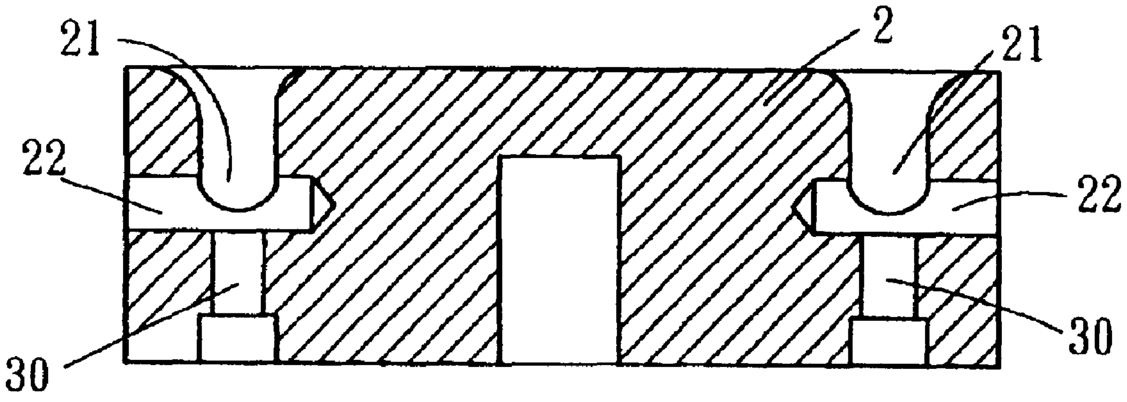
FIG. 4 is a sectional view taken along line A—A in FIG. 2.

Referring to FIG. 3B, an inner end portion 10 of the paper pipe 1 is pared so that the inner end portion 10 of the paper pipe 1 is easily bent by the shafts 3 of the molding device of the present invention in order to form an inward incurved end 11.

The expanders 4 decrease a friction between the paper pipe 1 and the molding head 2.

Figure 5:
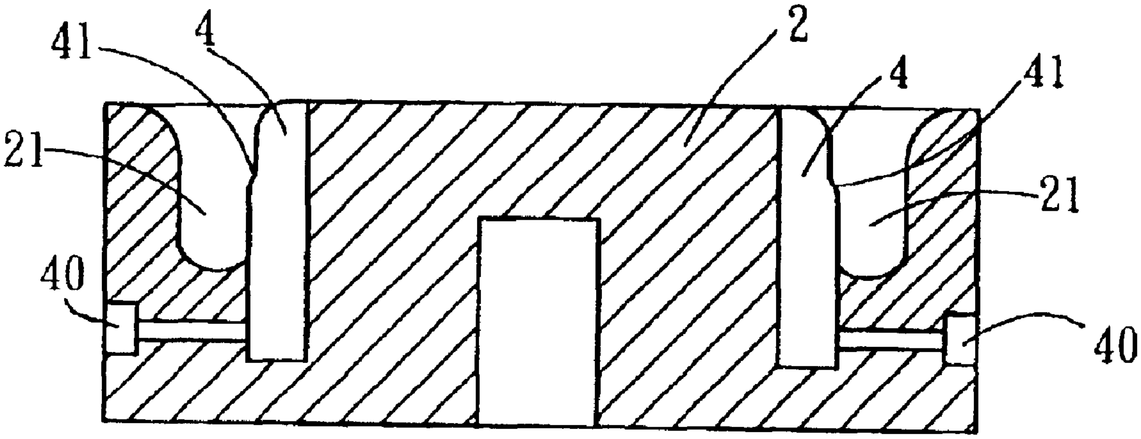
FIG. 5 is a sectional view taken along line B—B in FIG. 2.
Figure 6:
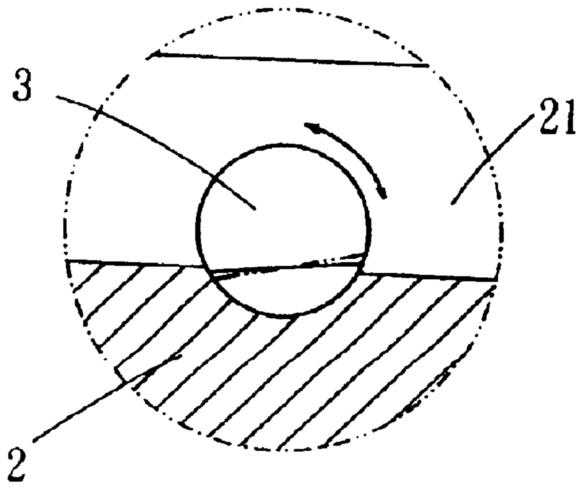
FIG. 6 is a sectional view taken along line C—C in FIG. 2.
Figure 7:
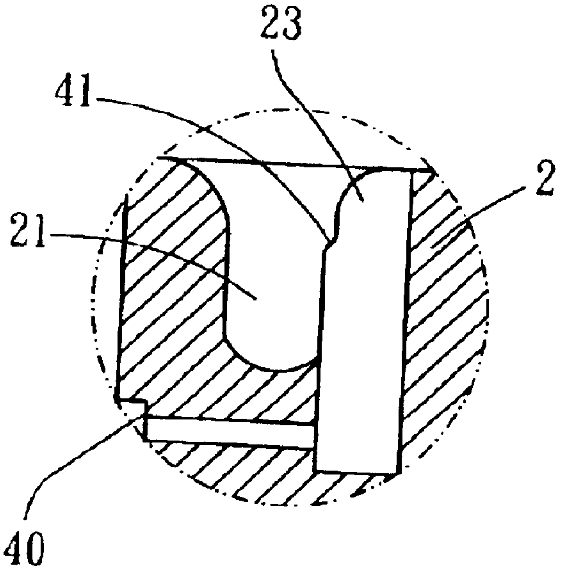
FIG. 7 is a sectional view taken along line D—D in FIG. 2.
Figure 8A:
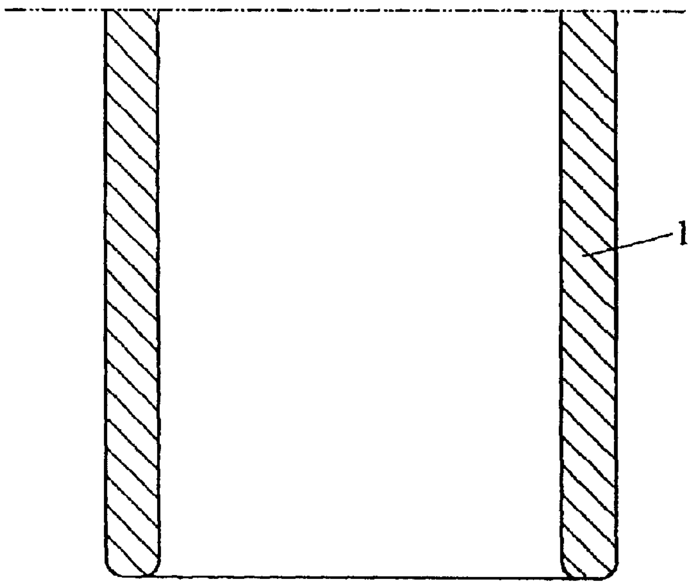
FIG. 8A is a sectional view of a paper pipe which has a smooth end edge.
Figure 8B:
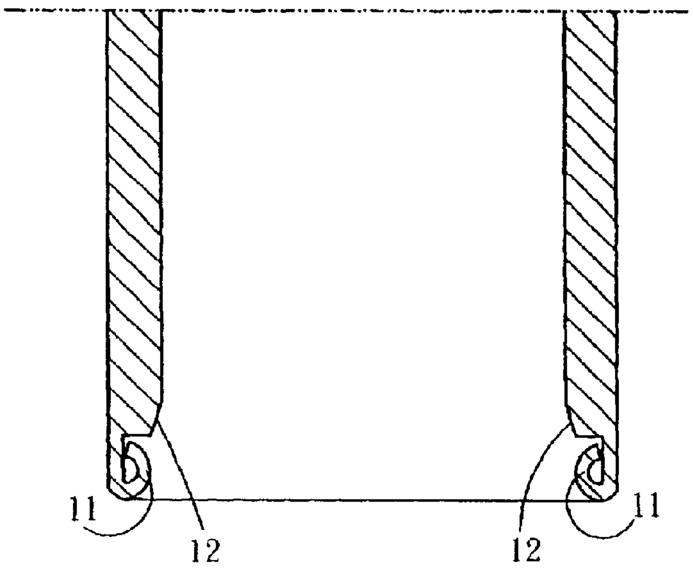
FIG. 8B is a sectional view of a paper pipe which has an inward incurved end and a chamfer angle.
Figure 9:
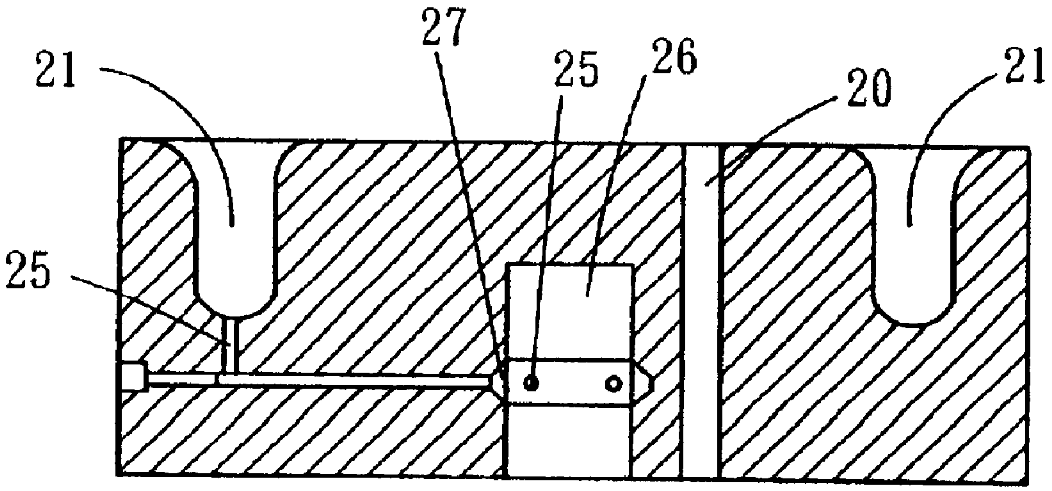
FIG. 9 is a sectional view of a molding head of a preferred embodiment in accordance with the present invention.
Figure 10:
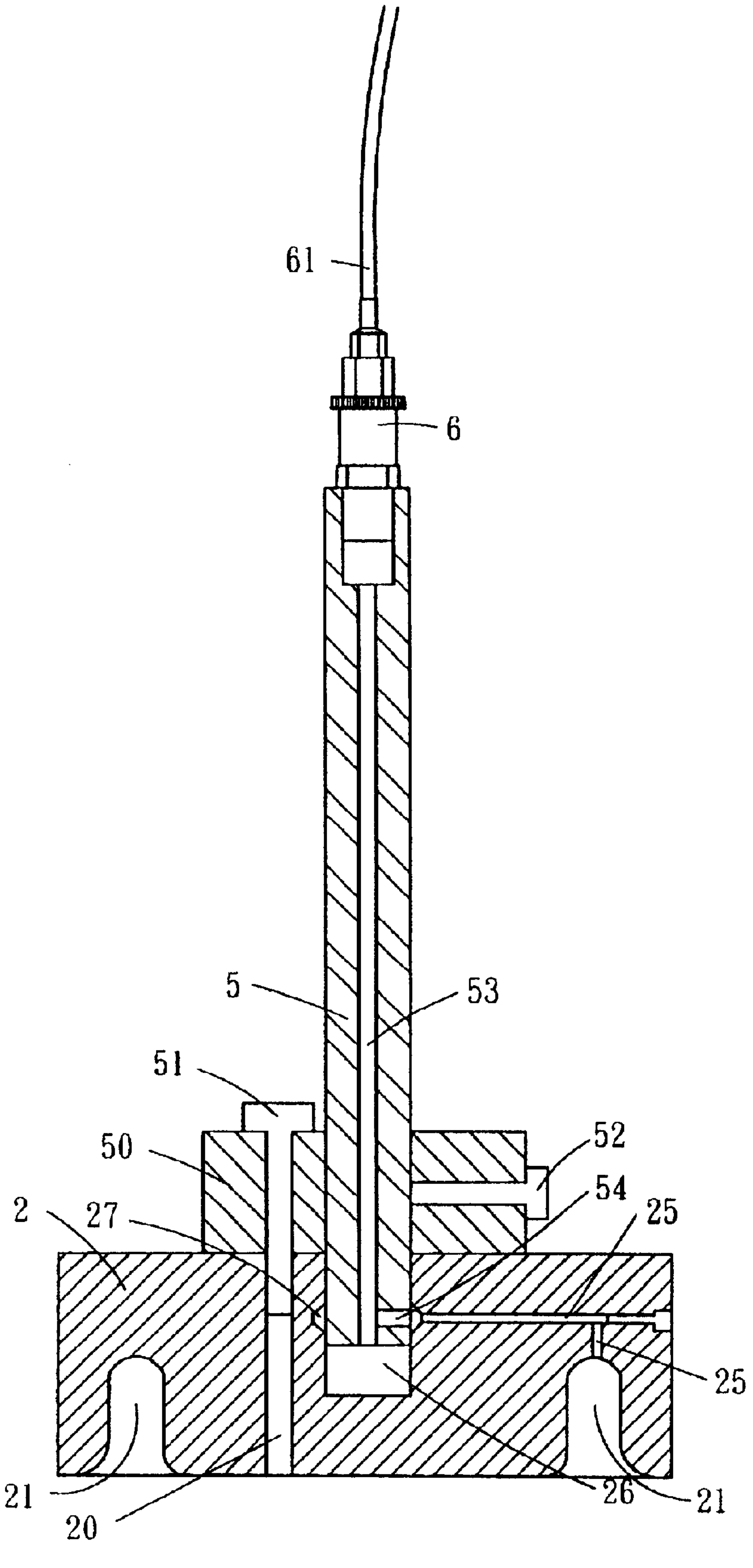
FIG. 10 is a sectional assembly view of a molding device for molding an inner portion of a paper pipe of a preferred embodiment in accordance with the present invention.

Referring to FIGS. 5 and 7, each of the expanders 4 has a stepped portion 41 to cut the inner end portion 10 of the paper pipe 1 to form a chamfer angle 12.

The molding head 2 further has a plurality of threaded holes 24.

Each of the threaded holes 24 of the molding head 2 receives a screw 40.

The present invention has the following advantages. The inner portion of the paper pipe is processed by the molding head of the present invention smoothly. A chamfer angle of the inner end portion of the paper pipe is easily formed. The inner portion of the paper pipe is lubricated by the lubricating oil.

The present invention is not limited to the above embodiment but various modification thereof may be made. Furthermore, various changes in form and detail may be made without departing from the scope of the present invention.

I claim:

1. A molding device for molding an inner portion of a paper pipe comprises:

a molding head, an annular seat disposed on the molding head, an oil supply tube inserted through the annular seat and inserted in the molding head, a rotating device connected to the oil supply tube, and an oil pipe connected to the rotating device, the molding head having a center hole, a plurality of threaded apertures, an annular guide groove, a plurality of round holes communicating with the annular guide groove, a plurality of expanders, a plurality of expander receiving grooves, and a plurality of shafts, each of the expanders inserted in the corresponding expander receiving groove of the molding head, each of the shafts having a recess, and each of the shafts inserted through the corresponding round hole of the molding head.

2. The molding device as claimed in claim 1, wherein each of the expanders has a stepped portion.

3. The molding device as claimed in claim 1, wherein the oil supply tube has an oil release channel and a plurality of oil release holes communicating with the oil release channel, and the molding head further has an annular channel matching the oil release holes of the oil supply tube and a plurality of oil apertures communicating with the center hole.

4. The molding device as claimed in claim 1, wherein a first bolt fastens the annular seat and the molding head together.

5. The molding device as claimed in claim 4, wherein a second bolt fastens the annular seat and the oil supply tube together.

* * * * *